US012591242B2

(12) United States Patent
Servant et al.

(10) Patent No.: US 12,591,242 B2
(45) Date of Patent: Mar. 31, 2026

(54) METHOD AND APPARATUS FOR OBTAINING OBSERVATION DATA OF AN ENVIRONMENT

(71) Applicant: InterDigital CE Patent Holdings, SAS, Paris (FR)

(72) Inventors: Fabien Servant, Bourgbarré (FR); Olivier Bureller, Chateaugiron (FR); Philippe Robert, Rennes (FR); Pierrick Jouet, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 153 days.

(21) Appl. No.: 18/037,558

(22) PCT Filed: Nov. 4, 2021

(86) PCT No.: PCT/EP2021/080684
§ 371 (c)(1),
(2) Date: May 17, 2023

(87) PCT Pub. No.: WO2022/106216
PCT Pub. Date: May 27, 2022

(65) Prior Publication Data
US 2023/0409041 A1      Dec. 21, 2023

(30) Foreign Application Priority Data
Nov. 18, 2020      (EP) ..................................... 20306403

(51) Int. Cl.
*G05D 1/00*            (2024.01)
(52) U.S. Cl.
CPC ......... *G05D 1/0274* (2013.01); *G05D 1/0094* (2013.01)

(58) Field of Classification Search
CPC .. G05D 1/0274; G05D 1/0094; G05D 1/0282; G05D 1/105
See application file for complete search history.

(56) References Cited

U.S. PATENT DOCUMENTS 2,924,459 A * 2/1960 Bryant ................... A63H 33/40
                                                                446/179
3,005,409 A * 10/1961 Dunlap ................. F42B 14/064
                                                                102/523

(Continued)

FOREIGN PATENT DOCUMENTS

WO        WO 2014066405 A1      5/2014
WO        2016/059470 A1        4/2016
WO        WO-2020064969 A1 *    4/2020 ............. B64C 29/02

OTHER PUBLICATIONS

English Translation for WO-2020064969-A1 (Year: 2020).*

*Primary Examiner* — Faris S Almatrahi
*Assistant Examiner* — Moises Gasca Alva
(74) *Attorney, Agent, or Firm* — Condo Roccia Koptiw LLP

(57)                ABSTRACT

A robot (20) includes a base (203, 204) and a detachable probe (205). The probe (205) includes at least one sensor of a least one type. Propulsion of the probe is provided by an ejection mechanism (204, 302) in the base. When the probe is ejected by the base, the probe captures data using its sensor(s) during its trajectory, according to an observation plan established by the base. The probe is recaptured by the base, probe data is transferred to the base, and the probe (205) is configured for a new observation.

24 Claims, 9 Drawing Sheets

(56)         References Cited

U.S. PATENT DOCUMENTS

| | | | |
|---|---|---|---|
| 2002/0196339 A1* | 12/2002 | Heafitz | F41G 3/02 |
| | | | 348/117 |
| 2007/0171042 A1* | 7/2007 | Metes | G08B 13/19621 |
| | | | 340/539.22 |
| 2012/0043411 A1* | 2/2012 | Beck | F41F 3/042 |
| | | | 102/374 |
| 2015/0128823 A1* | 5/2015 | Akcasu | F42B 10/56 |
| | | | 102/501 |
| 2016/0293015 A1* | 10/2016 | Bragin | B64U 30/293 |
| 2020/0258400 A1* | 8/2020 | Yuan | G08G 5/0034 |
| 2020/0398139 A1* | 12/2020 | Harley | A63B 69/38 |
| 2021/0035455 A1* | 2/2021 | Hall | B64U 70/90 |

* cited by examiner

20

205

205

204

203

201

202

METHOD AND APPARATUS FOR OBTAINING OBSERVATION DATA OF AN ENVIRONMENT

CROSS REFERENCE TO RELATED APPLICATIONS

This application is a U.S. National Stage Application under 35 U.S.C. § 371 of International Patent Application No. PCT/EP2021/080684, filed Nov. 4, 2021, which is incorporated herein by reference in its entirety.

This application claims priority to European Application No. 20306403.5, filed Nov. 18, 2020, which is incorporated herein by reference in its entirety.

FIELD

The present disclosure generally relates to the field of robotics, and in particular for capturing information about a robot's environment.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

In robotics, observation of a robot's environment is important for efficient functioning of the robot. Therefore, the robot is equipped with one or more sensors that enable it to capture its environment. For example, a robotic vacuum cleaner or a dedicated robotic measuring device may use a LIDAR to create a two-dimensional (2D) map (floorplan) of its environment, including walls and obstacles such as furniture, and use the 2D map in order to improve cleaning efficiency. A 2D observation of the robot's environment has, however, shortcomings regarding a three-dimensional (3D) observation. A 3D mapping of the environment may give the robot an improved understanding of the nature of the obstacles detected and this knowledge may add to the efficiency of the robot and its displacements. For example, a 3D observation in a home, office or other environment may enable to determine that an obstacle in the plane where the robot evolves is an object that may be pushed aside in order to clear the robot's path, or otherwise easily be circumvented, much like a human would do. However, 3D mapping of the environment may require complex moving parts, which may be undesirable as it may increase costs due to increased complexity and may limit the device's possibility for displacement/movement.

There is thus a need to further improve environment observation for devices.

SUMMARY

According to one aspect of the present disclosure, there are provided methods for obtaining observation data of an environment, according to the described embodiments and appended claims.

According to a further aspect of the present disclosure, embodiments of a device implementing at least one of the methods for obtaining observation data of an environment are described and claimed in the appended claims.

BRIEF DESCRIPTION OF THE DRAWINGS

More advantages of the present disclosure will appear through the description of particular, non-restricting embodiments. To describe the way the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous FIG. will not be described again to avoid unnecessary obscuring the disclosure. The embodiments will be described with reference to the following drawings in which.

Figure 1A:
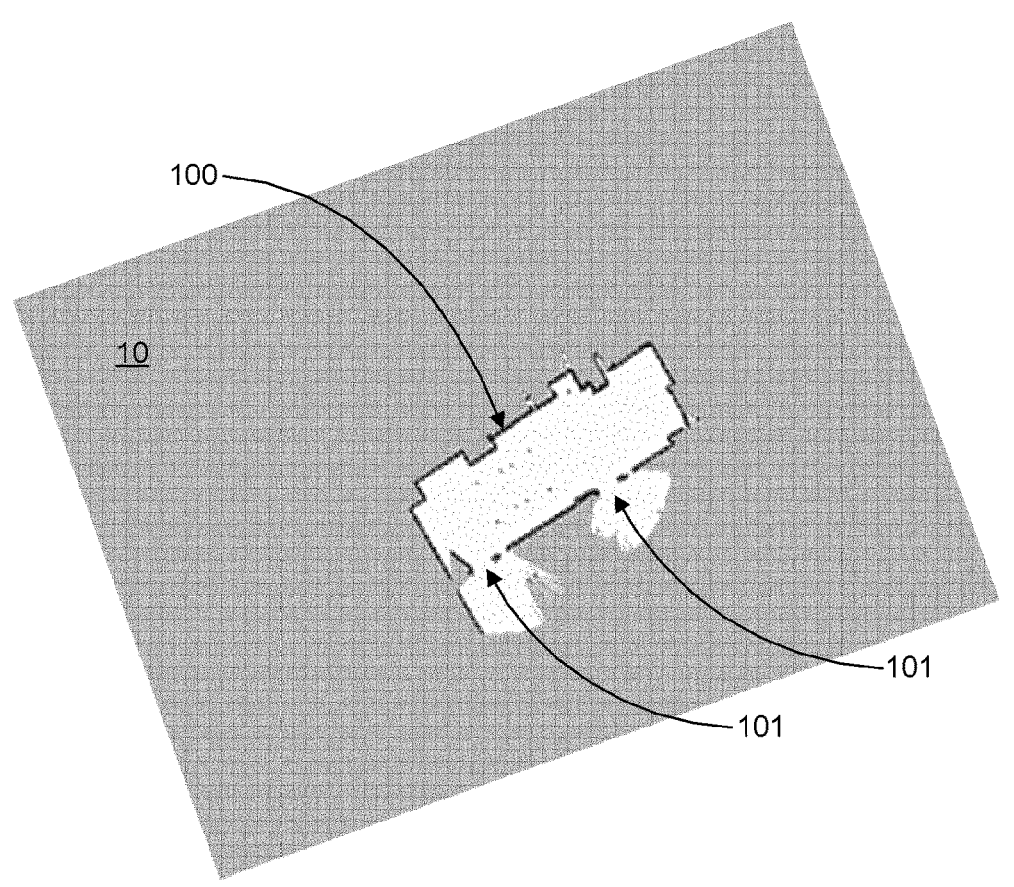
FIG. 1a is a 2D grid map of an environment, determined by means of a 2D LIDAR.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As set forth in the background section, a robot's efficiency may be improved when the robot obtains a 3D mapping of its environment. However, this may imply an increased complexity and encumberment of the robot, which may be undesirable. The embodiments described herein give some non-limited implementation examples of solutions to these and other problems.

A robot device may be equipped with one or more exteroceptive sensor(s) for measuring the robot's environment. A sensor is, for example, a camera or a depth sensor, a temperature sensor, a humidity sensor, or a radiation sensor. As the environment observation is dependent on the sensor location and orientation, it may be suitable to move the robot device, and thus the sensor(s), through the environment to get a more exhaustive understanding of the environment. For example, when a camera sensor is used, it may be required to observe the same object from multiple points of view (top, side) in order to obtain a 3D representation of it. For example, the robot device may be a robotic vacuum cleaner. While the robotic vacuum cleaner device may be able to overcome low obstacles such as a doorsill, it is essentially a surface device that explores a 2D plane of its environment only. But, in order to explore the environment in three dimensions, it is much more difficult to move the robot and enable its sensors to explore all three dimensions. As mentioned previously, limiting the robot's motion to the 2D plane may create a restriction on the observation, which may limit the robot's performance and its efficiency in executing the tasks for which it has been designed.

A possible solution would be that the robot is enabled for flight, much like an Unmanned Aerial Vehicle (UAV), or drone. Using this solution, obviously the third dimension problem is leveraged. However, it is difficult and costly to obtain a robust, silent and safe solution based on a drone. In addition, this may not be possible or accepted for use in an indoor environment such as an office or house, especially in the presence of animals and humans.

Another possible solution would be to use an extendible robotic arm, for example telescopic, the arm including sensors at one end. This may require considerable additional hardware, may be fragile, and may impede a compact design. It may also adversely affect the robot's stability; when the arm accidentally encounters an object, the robot may tip over, rendering the robot inoperable. Again, it may not be possible to use this solution in an indoor environment in the presence of animals and humans because of an increased risk of injury.

FIG. 1*a* is a 2D grid floor map 10 of an environment, determined by means of a robot capable of moving in the 2D plane. The robot is for example equipped with LIDAR (Light Detection and Ranging, for range/distance sensing through a laser device) sensor(s) to this end. The 2D grid map gives information about the environment in the plane where the robot moves. The 2D grid map enables to detect the presence of walls/furniture 100, doors/openings 101.

Figure 1B:
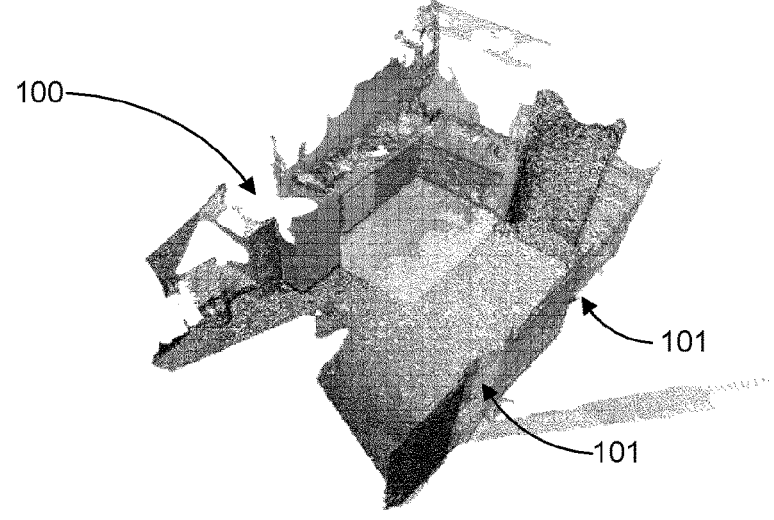
FIG. 1b is a 3D point cloud of an environment, as determined by means of a 3D depth sensor.

FIG. 1*b* is a 3D cloud point of the same environment, determined by means of a robot capable of moving in the 3D plane. The robot may, for example, be equipped with range/distance sensor(s) as above. The cloud point may be obtained by aggregation of many cloud point slices, each slice being obtained at a different height of the robot.

It may be observed that the 3D cloud point may be useful in determining that an opening is a door that may lead to another room, or rather a window that does not, and that there is no movable furniture in the room, only fixed furniture that is positioned against the walls (such as cupboards fixed to the walls), or rather, that the room includes moveable furniture or other objects, objects that can be moved or circumvented by the robot. As to objects that may be moved (e.g., pushed aside) by the robot (e.g., to clear the path for a cleaning robot), the robot may be preconfigured with a list of objects that it is authorized to move, and possibly an emplacement where to move the objects to, much like a human would do when performing a cleaning task.

Figure 2:
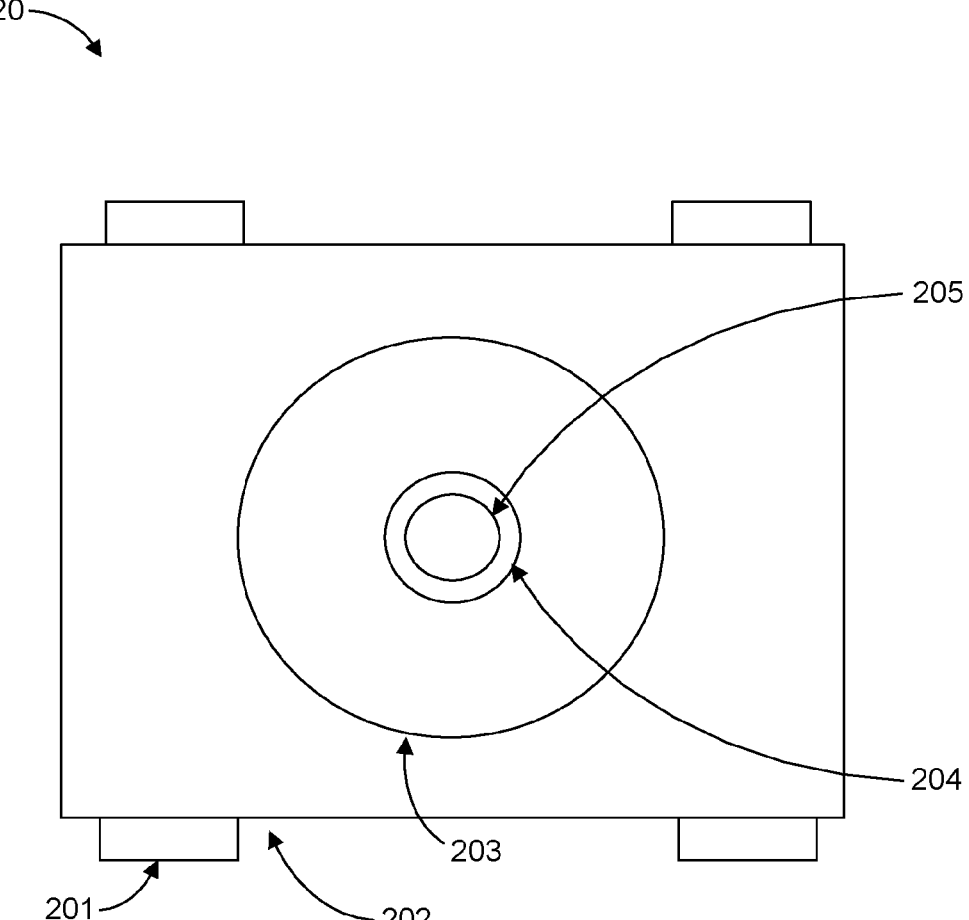
FIG. 2 is a top view of a robot having a detachable probe according to an embodiment.

FIG. 2 is a top view of a robot (host, host device, base, base device) having a detachable probe ('probe') according to an embodiment, the probe including one or more sensors for obtaining a 3D mapping of the robot's environment. The robot 20 has a body 202 with displacement or movement mechanism such as wheels 201. Other displacement or movement means may be contemplated such as tracks, rollers or air cushion, to name a few. The body 202 includes a capturing arrangement (bowl, curvature) 203 with a probe storage-and-launch-space (tube, opening, cavity, emplacement) 204. Capturing arrangement 203 and probe storage-and-launch-space 204 form a reception arrangement. The capturing arrangement 203 and the probe storage-and-launch-space 204 may form a funnel. Inside the probe storage-and-launch-space is a detachable probe 205 ('probe' hereinafter). Under the probe storage-and-launch-space 204 is an ejection mechanism for ejecting probe 205, here an electromagnet 301 with a piston 302 (see FIG. 3; not shown in FIG. 2). The ejection mechanism may be located elsewhere, e.g., at the side of probe storage-and-launch-space 204. The term 'detachable' in the context of the probe meaning that the probe is an entity/device that may be separated from the robot/base device such as to enable its ejection from the robot/base device, notwithstanding that the probe may be attached to the robot/base device through a wire or cable.

Figure 3:
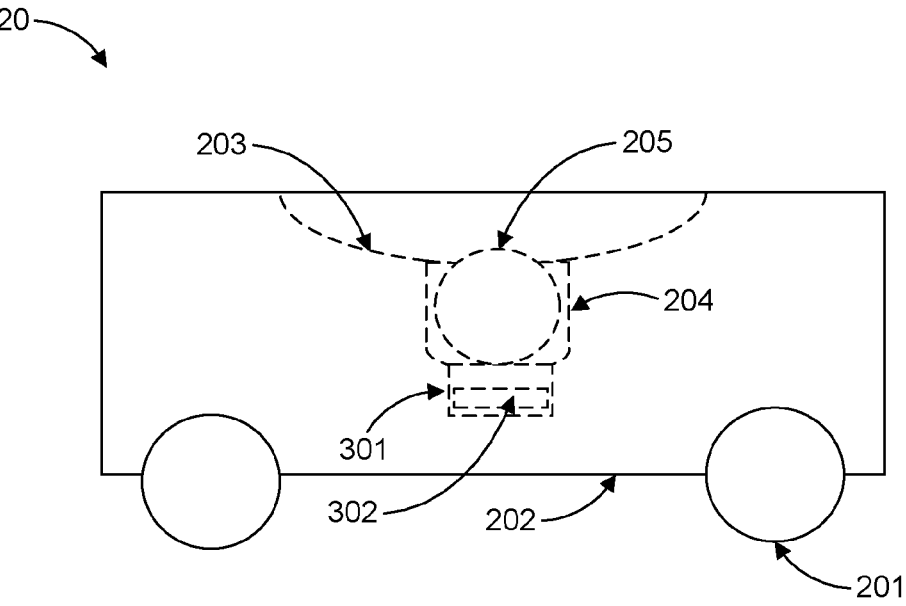
FIG. 3 is a side view of the robot of FIG. 2.

FIG. 3 is a side view of robot 20. The presence of elements 203-205 and 301-302 inside body 202 is indicated through dashed lines as a see-through view. The example ejection mechanism that includes elements 301 (electromagnet) and 302 (piston) is shown.

Figure 4A:
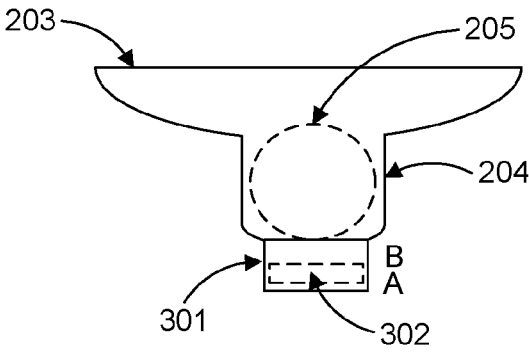
FIGS. 4a and 4b are close-up views of some specific elements of the robot according to an embodiment.

FIG. 4*a* is a close-up view (zoomed view) of elements 203-205 and 301-302, explicitly showing the capturing arrangement 203, the probe storage-and-launch-space 204, ejection mechanism 301-302, and probe 205. Alternatively, it can be argued that the ejection mechanism includes probe storage-and-launch-space 204 as probe storage-and-launch-space 204 may play a role in the ejection of probe 205 as will be explained further on, while it can also be argued that probe storage-and-launch-space 204 is part of capturing arrangement 203, as probe 205 is contained in the recipient/tube when in its rest (docking) position. The piston 302 having two possible positions A and B, is here depicted in position A, and probe 205 being located inside probe storage-and-launch-space 204, probe 205, while in a rest position as depicted, is ready to be ejected (launched).

Figure 4B:
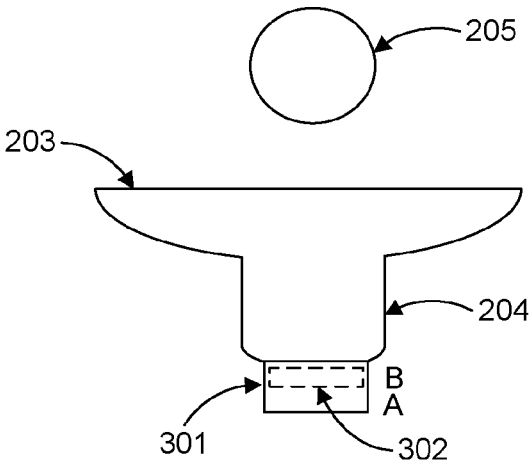

FIG. 4*b* is another close-up view of elements 203-205 and 301-302. Electric energy provided to electromagnet 301 has caused piston 302 to move to position B which in turn has caused the ejection (launching) of probe 205. As mentioned previously, electromagnet 301 and piston 302 constitute a probe ejection mechanism. Other embodiments for ejection mechanisms than shown are described further on. When probe 205 has reached its highest point and returns to robot 20, it is captured by capturing arrangement 203, which, because of its form, will direct the probe to probe storage-and-launch-space 204. When probe 205 is in the air, it may capture (observe) the environment of robot 20/the environment of the probe using its sensor(s). Once probe 205 is in probe storage-and-launch-space 204, it is in a rest (docking) position, and the probe may be configured for a next observation. According to embodiments, robot 20 may protect probe 205 from intentionally or unintentionally being removed from probe storage-and-launch-space 204. According to an embodiment, securing probe 205 in probe storage-and-launch-space 204 is done by mechanical means, such as, for example, a hatch, flap or shutter in the top of the probe storage-and-launch-space 204 and probe 205, or an (electromechanical) magnet that attracts probe 205 to the bottom of the probe storage-and-launch-space 204 and that keeps it in its docking position, or air suction that may guide probe 205 to probe storage-and-launch-space 204 and that may keep it in its docking position once it is located in probe storage-and-launch-space 204, or any combination of these embodiments. According to embodiments, the securing/docking and/or the ejection mechanisms may be armed/prepared for a next ejection of the probe through a mechanism that is mechanically linked to an arrangement of robot responsible for movement of the robot 20. The arming/securing (docking) may be performed during movement of the robot.

While FIGS. 2-4 are example embodiments of a robot having a detachable probe, the probe including sensors for capturing the robot's/probe's environment, other embodiments are possible without diverging from the present principles. For example, capturing arrangement 203, of which the function is to capture probe 205 and to guide probe 205 to probe storage-and-launch-space 204 when it returns back to robot 20 after having been ejected, has, according to embodiments, an oval, trapezoid or funnel form. Also, according to a different embodiment, capturing arrangement 203, instead of being formed in body 202 as depicted in FIGS. 2-4, may extend from body 202, e.g., may extend from the top or the side of body 202. According to a further embodiment, capturing arrangement 203 including probe storage-and-launch-space 204 extends from body 202. According to a further embodiment, capturing arrangement 203 including probe storage-and-launch-space 204 and probe ejection mechanism 301/302 extends from body 202. According to an embodiment, at least part of elements 203-205 and/or 301-302 are rotatably mounted (in)to body 202, so as to enable directing the ejection trajectory of probe 205 according to the orientation, inclination, tilting or rotating of at least part of the elements 203-205 and/or 301-302, or to compensate for an inclination of robot 20 when the latter is positioned on an inclined/sloping surface.

Probe storage-and-launch-space 204 is not necessarily arranged in the center of capturing arrangement 203, but may be located in the lowest point of capturing arrangement 203 according to embodiments, so that the probe, when captured by capturing arrangement 203, is directed to probe storage-and-launch-space 204 through gravity.

According to an embodiment, the capturing arrangement 203 may lead to an opening that is different from the probe docking location. The probe may then, once it has been captured after having been ejected, directed to its docking location from the opening in the capturing arrangement 203, for example through a tube or passageway.

According to an embodiment, the probe storage-and-launch-space 204 and the capturing arrangement 203 form a single shaped reception and/or ejection arrangement where the probe storage-and-launch-space 204 and the capturing arrangement 203 are merged and are not distinguished from each other. The reception/ejection arrangement shape may have, for example, a V-form or a tube form, or be deformable like a net or fabric.

Probe 205 includes at least one sensor for capturing of the environment of robot 20. As described previously, probe 205 is ejected (launched) in the air when the ejection (launching) mechanism is operated. The ejection mechanism's orientation (that may be operated through rotation, tilting, inclination), or the robot's movement itself, may give an additional horizontal component to the trajectory of probe 205. According to an embodiment such as depicted with the help of FIGS. 2-4, the energy necessary for launching probe 205 is provided by the robot 20. According to this embodiment, probe 205 is therefore a passive device regarding its propulsion (displacement, movement) in the air. According to an embodiment, robot 20 may eject probe 205 with a determined (adjustable, parametrizable, configurable) force, to launch the probe at a specific (predetermined, configured) height, where the height is further dependent on parameters such as the force applied for its ejection, the weight of probe 205, and its aerodynamic characteristics and possibly its spin (rotation). The ejection mechanism may be as described with the help of FIGS. 3-4. According to another embodiment, the ejection of probe 205 is provided by pressurized air or other pressurized gas. According to an embodiment, probe 205 may be held up in the air for increased observation duration and observation height adjustment due to a pressurized air column generated by robot 20 and flowing, for example, out of probe storage-and-launch-space 204. The latter embodiment may be interesting when robot 20 is a vacuum cleaner, as the air flow created by the output of the vacuum cleaner motor may be directed, using an air valve, to the probe storage-and-launch-space 204 so as to create the air column output from the probe storage-and-launch-space. According to yet another embodiment, ejection of probe 205 is provided by a spring. According an embodiment, probe 205 has the shape of a ball like depicted in FIGS. 2-4. According to embodiments, probe 205 has a different shape, such as a cylinder shape, a disc shape, a frisbee shape, a spheroid shape, a cubic shape, a stick shape, a dome (or parachute) shape, a kite shape or yo-yo shape. According to embodiments, the shape of probe 205 is designed to obtain specific probe features such as aerodynamical features such as the previously mentioned frisbee shape, a dome (parachute-like) shape or a kite shape, or may deploy winglets in order to stabilize the probe/to extend the observation duration associated with an ejection. The dome and kite probe shapes may in particular be used in combination with the previously discussed pressurized air embodiment, and have the further advantageous feature in that they can be attached with a string or wire to the robot 20 in order to facilitate return/retrieval of the probe to the robot after an ejection. A yo-yo shaped probe may also be used. A frisbee-shaped probe may be advantageous when the probe is used in large spaces such as factory halls. According to an embodiment, the probe, when ejected, is given, by the ejection mechanism and/or by the probe storage-and-launch-space a determined rotation that enables the probe to stabilize itself through spin-stabilization or gyroscopic effect. For example, the probe storage-and-launch-space may have a threading or rifling that gives spin to the probe when it is ejected. For example, the probe storage-and-launch-space may contain an air nozzle in one of its side walls that gives spin to the probe before or during its ejection. For example, the probe storage-and-launch-space may include a mechanism that enables to give a predetermined amount of spin (rotation) to the probe, e.g., through an electromagnetic arrangement, air pressure, and/or bearings, before or during ejection. According to this embodiment, the probe's Inertial Measurement Unit (IMU) measures the rotation of the probe while performing an observation and determines, as a function of the measured rotation, the exposure duration and/or number of images taken per 360° rotation of its on-board optical camera sensor, in order to construct a usable set of images or video. Likewise, the probe may determine, as a function of the measured rotation, the number of distance measurements performed per 360° rotation with the probe's distance measurement sensor. The IMU readings may be coupled to each observation or to a number of observations, possibly coupled to a timestamp generated by the probe internal clock, to comprise the observation data, so that it may be determined from the observation data that an observation was made at a particular angle and time, and/or to compensate for undesired effects due to the rotation (such as blurring, smearing, tearing effects), which may be compensated for (corrected) by post- or preprocessing the observation data (such as image processing). Alternatively, it may be wished that the probe has no rotational movement when ejected, e.g., for stabilizing images taken by (a) (relatively slow) optical sensor(s) and avoid motion blur and/or rolling shutter effects. To this end, and according to embodiments, the probe may include at least one motor. The IMU may sense the movement of the probe and actuate the at least one motor, as a function of the movement sensed by the IMU, thereby giving rotational movement (spin) to at least one of a set of orthogonally mounted discs or circles of the probe to create a compensating angular momentum vector and to bring the rotation of the probe to a halt and possibly to give the probe a desired orientation. The embodiment may also be used to give the probe any desired orientation during its trajectory, which may also be useful, for example, when the probe has only one sensor, so that the one sensor can be oriented to make a 360 degree turn during its trajectory.

A probe having multiple types of sensors may be ejected at a same location several times in order to perform different observations that use different types of sensors. For example, the probe may be ejected with a predetermined spin when the LIDAR sensor(s) is (are) used in a first observation, then be ejected without spin to do an observation at the same spot when the optical sensor(s) is (are) used for a second observation. The observation data made with the different types of sensors may be used to create a single observation data set.

For retrieval of the probe, different embodiments may be contemplated than that depicted in FIGS. 2-4. According to an embodiment, the robot does not include capturing arrangement 203. Such embodiment may be contemplated when the return trajectory of probe 205 is (essentially) predictable, like when probe 205 is attached with a string or wire to robot 20 (e.g., when the probe is kite, yo-yo, or dome shaped) and can be easily brought back to robot 20 by the wire being rewound, or when using the pressurized air embodiment. Such embodiment may also be contemplated when the robot has calculated the trajectory of probe 205, and the robot may position itself at the expected probe landing spot to recapture it. The trajectory calculation may be stored and used as a reference for each new ejection that is done with same parameters. Such embodiment may also be contemplated when the robot has means to follow the trajectory of the probe, such as a camera, and may then position itself at the expected probe landing spot. Another embodiment for recapturing probe 205 after ejection may include capturing probe 205 once it has returned to the surface (floor) where robot 20 is located. According to such embodiment, robot 20 may locate probe 205 once this is on the floor and include a hatch, flap or opening for capturing the probe as the robot is moved to be positioned near to/over the probe. According to an embodiment, robot 20 may detect that probe recapturing has failed, for example, when probe is not detected in its rest position at its expected return time after an ejection. Such detection may be done using (a) sensor, such as an optical sensor, pressure sensor, or a switch engaged/disengaged by the weight of the probe. When it is determined that probe has not returned to the base as expected, the robot may search for the probe, locate it, and move to it to capture it. Alternatively, the robot may generate an alarm and wait for a user to search for the probe and to return it to the robot's capturing arrangement 203. Still alternatively, the robot may have a stock of probes and may continue its observations as long as it has at least one remaining probe.

According to an embodiment, the robot 20 may move around and may repeatedly eject probe 205 to perform observations of its environment. According to an embodiment, robot 20 may stop when an observation is performed and continue to move to a next position when the probe 205 has been recaptured. According to another embodiment, robot 20 may eject probe 205 while in movement, and give probe, through the robot's movement, a ballistic trajectory dependent on the force applied to eject probe 205, the weight of probe 205, and further depending on the movement and speed of robot 20. Robot 20 may then move to the expected landing location of probe 205 and capture, at the expected landing location, probe 205. According to a different embodiment, the ejection direction of probe 205 may be oriented by orienting or tilting the ejection mechanism. Likewise, capturing arrangement 203 including probe storage-and-launch-space 204 may be oriented/tilted to recapture probe 205 when it falls back. According to an embodiment, robot 20 further comprises a distance sensor device (distance meter), such as a laser distance sensor device, to measure the height clearance for ejection of probe 205. Based on the distance meter, the robot can determine whether probe 205 can be ejected and at which height, thereby avoiding obstacles that may be in the ejection path or trajectory.

According to an embodiment, a robot may launch/eject multiple probes simultaneously or substantially simultaneously, to perform a single observation using the multiple probes.

According to an embodiment, multiple robots may cooperate to perform observations using a single probe. For example, a first robot may eject the probe at destination of a second robot, that will capture the probe, while the first robot moves to another location, at which location it will receive the probe ejected by the second robot, and so on. This way, an observation of an environment can be performed in a quick and efficient manner.

In this way, multiple probe ejections may be performed and associated environmental observations may be done. For example, a robot may perform multiple observations at different locations in a room (or area) to get a 3D mapping of the room (area), determine any obstacles, possibly determine the nature of the obstacles in the room, and possibly discover any passages/pathways to other rooms (areas). According to embodiments, the probe sensor(s) may capture the probe's environment during a specific moment of the probe's ejection, such as when it reaches its highest point, or continuously or periodically during its ascent or descent or any combination of the previous. The latter embodiment enables to observe the environment as slices, each slice corresponding to a measurement of its environment at a different height.

The detachable probe, such as probe 205, may be a passive device with regard to its displacement and possibly with regard to its orientation (e.g., its orientation may be predetermined by its spin or and/or by its form given its features, e.g., inertial features, aerodynamical features). It contains at least one sensor and some electronics to drive the sensors and to retrieve measurements from them. The probe may send acquired data to its host device (e.g., to robot 20, or to a distant server) during observation or store them internally so that the host device may download the data from the probe later. Alternatively, the measurements may be stored in the robot or in the probe, and may be retrieved later from the robot or the probe by a tier device (e.g., a Personal Computer, or an USB stick). Data transmission/exchange between probe and host device may be done wirelessly, or via wires, according to embodiments. The latter method may be used, for example, in embodiments where the probe is attached to the host device via a wire (see previously discussed embodiments) or when the probe device is docked e.g., via a connector when the probe is recovered by the host device. The probe may, according to embodiments, include an Inertial Measurement Unit (IMU) which may include gyroscope sensor and/or accelerometer(s).

While the probe's outside surface may be essentially be made of a soft material such as a foam in order to avoid injury to persons or animals and to reduce noise when recaptured by the host device, the probe may have at least partly a hard surface, for example a hard plastic or metallic surface, meant to receive the ejection force from the host's ejection mechanism. In embodiments where the probe surface is at least partly metallic, magnetic force may be used to keep the probe in contact with the host when it is in its rest position. The magnetic force may also be used to dock the probe into its rest position according to a predetermined orientation, to ensure coupling of the probe to a data connector in the host device. The host device may alternatively or in combination also include mechanical parts to lock the probe in its rest position, such as electrically operated set of rollers (bearings) that enable to turn the probe in a predetermined orientation (position). Alternatively, the probe may be have a center of gravity that enables the probe to turn in the predetermined position, possibly helped of by rollers in the probe storage-and-launch-space 204.

An IMU in probe 205 may be used (together with a filtering algorithm) to measure rotation speed and to determine the ejection/launching phase, apex point, and return to host device phases. In addition, as previously mentioned, the IMU may be used to determine sensor exposure time and/or the number of observations (number and duration of sensor activations) per rotation, and the IMU data may be coupled to the sensor data, or to enable pre- or postprocessing in order to remove undesired effects from the observation data that are due to the probe's rotation. The IMU output may further be used to trigger observations. For example, observations are triggered during the ejection phase and during the apex point phase when the probe has an essentially vertical trajectory, because the position of the probe is considered to be the most stable during these phases of its trajectory. For example, observations are triggered during the ejection phase, the apex point phase, and the return to host device phase when the trajectory given by the host device has a horizontal component in addition to a vertical component because the position of the probe is considered to be stable in all phases of its trajectory. For example, observations are triggered only during the apex point phase. As mentioned previously, the probe's observations during its trajectory may be stored as observation slices (data), each slice corresponding to a different height (and horizontal position if the trajectory has an additional horizontal component) and may therefore be used to create a 3D point cloud of the robot's environment, for example.

According to an embodiment, the probe's sensor(s) is/are protected by its structure and are preferably placed inside or at least in recess of its surface. Probe sensors are for example, IMU(s), optical camera(s), and laser ranging sensor(s). The probe may be covered with hard rubber or any other material to reduce rebound when returning to the host device after having been ejected by the host device, thereby attenuating the amplitude of the rebound and thereby reducing the risk of not being captured by the host device. The probe structure may be engineered to absorb shocks using a slowly deformable structure.

The probe may contain one or several sensors of a same or of different types. When the probe is given spin, it may do with less sensors than when it is not given spin. For example, a single laser ranging sensor or optical camera may be sufficient for a full 360 degree observation when the probe is turning around an axis (e.g., a horizontal axis) when ejected, while several laser ranging sensors or optical cameras may be required for a same 360 degree observation when the probe is not turning around one of its axis when ejected. Observations made from a rotating probe may require more advanced post-processing (e.g., if the sensor is a camera, the images taken at different angles may need to be stitched together).

According to an embodiment, the IMU data is coupled and synchronized with the data of the other sensors, so that it can be determined, from the coupled and synchronized data, at which position of the probe an optical observation or laser ranging measurement was done.

According to an embodiment, the IMU data, synchronized with the other sensor data, is kept (stored, memorized) separately from the other sensor data, and/or transferred separately to the base, for example in a separate communication channel.

According to an embodiment, the probe may include a clock unit for timestamping the observations (measurements) and/or for triggering the observations. According to an embodiment, the robot pre-calculates (computes in advance) the trajectory of the probe preceding its ejection and then instructs the probe to trigger observations at predetermined time instants, that, for example correspond to one or more of the different phases of the probe's trajectory, and/or to different (vertical, horizontal) positions of the probe in its trajectory. If the probe is further given spin by the robot at its ejection, the robot may further predetermine the trigger moments by taking account of the probe's rotation, so as to predetermine the angle under which an observation is made by the probe. Then, given the timestamp of an observation, it can be determined at which position and angle the observation was made. A trigger for observation may be directed to one sensor or to multiple sensors at a same time. The triggers may be preloaded into the probe before its ejection, and/or transmitted to the probe during its trajectory. As mentioned previously, the probe may store the observation data and transfer the stored observation data when the probe has been re-captured by the robot, and/or transfer the observation data to the robot 'on the fly', when having completed an individual observation. Alternatively, the probe may store and transfer the observation data, for example it may store the observation for a number of triggers corresponding to individual observation of one slice of the point cloud, then transfer the stored observations to the robot, and restart this processing for a next number of triggers for a next slice.

Alternatively, the robot may instruct the probe to collect observation data autonomously at trigger moments that are determined by its IMU sensors. The robot may have pre-calculated the expected IMU data at given moments of the expected trajectory of the probe, for example ascending, zero gravity, descending, acceleration x or y m/s.

Alternatively, the instructions provided by the robot to the probe may be a combination of the above, the probe fine-tuning the moment of triggering an observation based on the timestamp trigger received from the robot while subordinating the observation to the IMU parameters observed and as specified in the instructions. For example, the robot may instruct the probe to do an observation from time $t_1$ to $t_n$, while the IMU parameters are between low and high, or low only, or high only value(s)/threshold(s).

A same type of robot device may use different type of probe devices, as the probe devices may be adapted to be used in a particular environment for optimal performance. A type of probe device is for example any of the probe devices as described previously, and types may be, for example, differentiated according to specific aerodynamic behavior, weight, dimensions, number and type of sensors embarked. Therefore, each probe type may have an identifier that is specific to the probe type. The probe type may be communicated to the robot when the probe is inserted in the robot by a user, for example. The robot may, depending on the probe type, parametrize different features related to the probe's ejection such as ejection force, spin on or off, initial spin speed, and trajectory (flight plan). The robot may also prepare an observation plan for the probe according to its type, including triggering moments and sensor(s) used.

Figure 5:
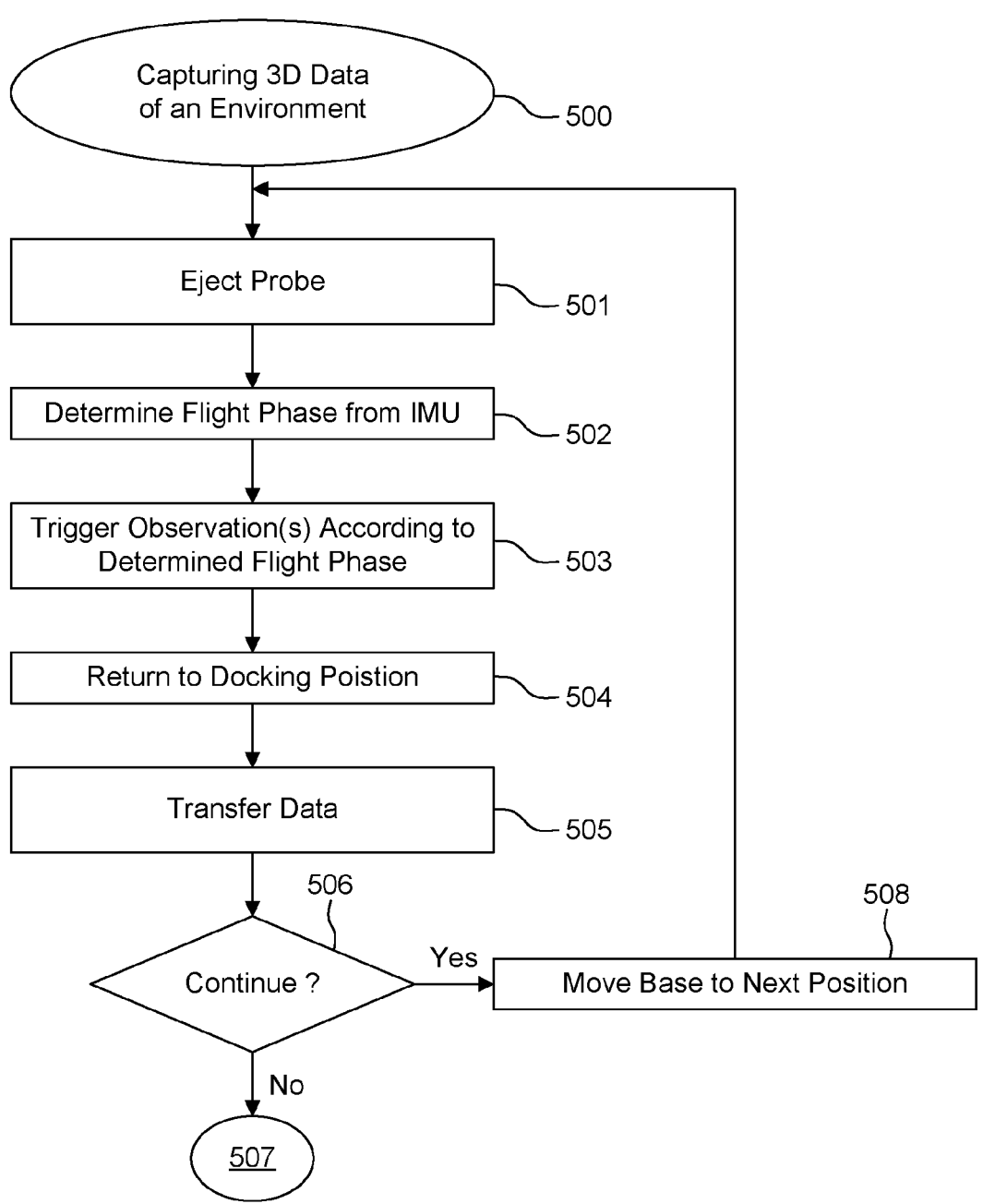
FIG. 5 is a flow chart of a method for obtaining data of an environment according to an embodiment.

FIG. 5 is a flow chart of an embodiment of a method 500 for obtaining observation data of an environment.

In a step 501, the probe is ejected from its docking position in the base.

In a step 502, the probe measures IMU parameters (e.g., acceleration and rotation speed) and determines, from the IMU parameters, the flight phase (e.g., ascent phase, apex phase, descent phase).

In a step 503, the probe triggers one or more observations according to the determined flight phase, the observations being performed using at least one of its built-in sensor(s).

In step 504, the probe is captured by the base and the probe is moved to a docking position for data transfer.

In a step 505, the data captured by the probe is transferred to the base.

In decisional step 506, it is determined whether further data capturing sessions are required and the base is therefore to be moved to a next position, or whether the data capturing sessions are done.

If further data capturing sessions are required (506—Yes), the base is moved, 508, to the next position, and the capturing process is repeated by returning to step 501.

If no further data capturing sessions are required (506—No), the capturing method ends, 507.

The data collected can now be processed by the base, or by (a) distant server(s), to create a map of the environment such as a 3D point cloud.

Figure 6:
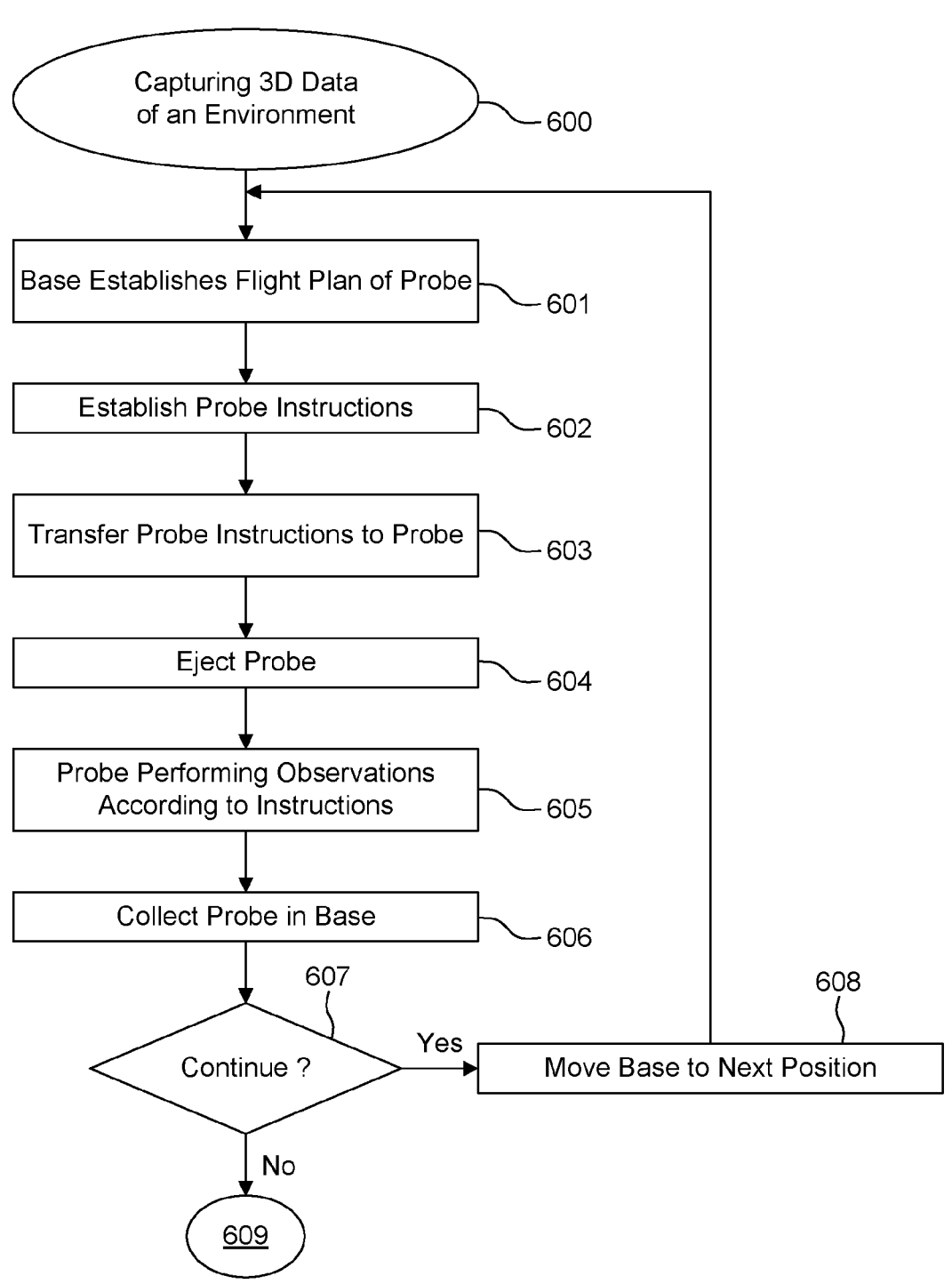
FIG. 6 is a flow chart of a further method for obtaining data of an environment according to an embodiment.

FIG. 6 is a flow chart of a different embodiment of a method 600 for obtaining observation data of an environment.

In a step 601, the base establishes a trajectory (flight) plan for the probe, according to the probe features that may include (flight) characteristics, probe configuration (e.g., number of sensors, type of sensors) and according to the desired observation. Probe (flight) characteristics and probe configuration may be obtained from the probe by identification of the probe (e.g., the probe providing an identifier to the base), and looking the identification number up in a table or database in order to find the probe features including (flight) characteristics and configuration. Probe (flight) characteristics and configuration may include features that enable the base to determine ejection parameters such as ejection force needed to eject the probe to a desired height, ejection angle to give it a desired trajectory, give it an amount of rotation or not, but also to establish its flight duration, flight path, so that it can establish the flight plan for the probe and triggering moments for observations by the probe.

In step 602, the base establishes probe instructions (configuration data) related to a schedule of trigger moments for triggering observations by the probe, according to the flight plan and probe type, where the probe type enables the base to retrieve the probe features.

In step 603, the base transfers the instructions to the probe.

In step 604, the base ejects the probe.

In step 605, the probe performs observations (captures data from its sensor(s)) during its flight (during a data capturing session that may cover the whole flight period or partly), based on the trigger moments received from the base, and stores the data from these observations.

In step 606, the probe returns to the base and is collected in its docking position in the base.

In step 607, the data captured by the probe resulting from the data capturing session is transferred to the base.

If no more data capturing sessions are to be performed (607—no), the method ends, 609. The data collected can now be processed by the base, or by (a) distant server(s), to create a map of the environment such as a 3D point cloud.

If further data capturing sessions are needed (607—Yes), the base is moved to a next position in step 608, and the method is repeated from step 601.

Figure 7:
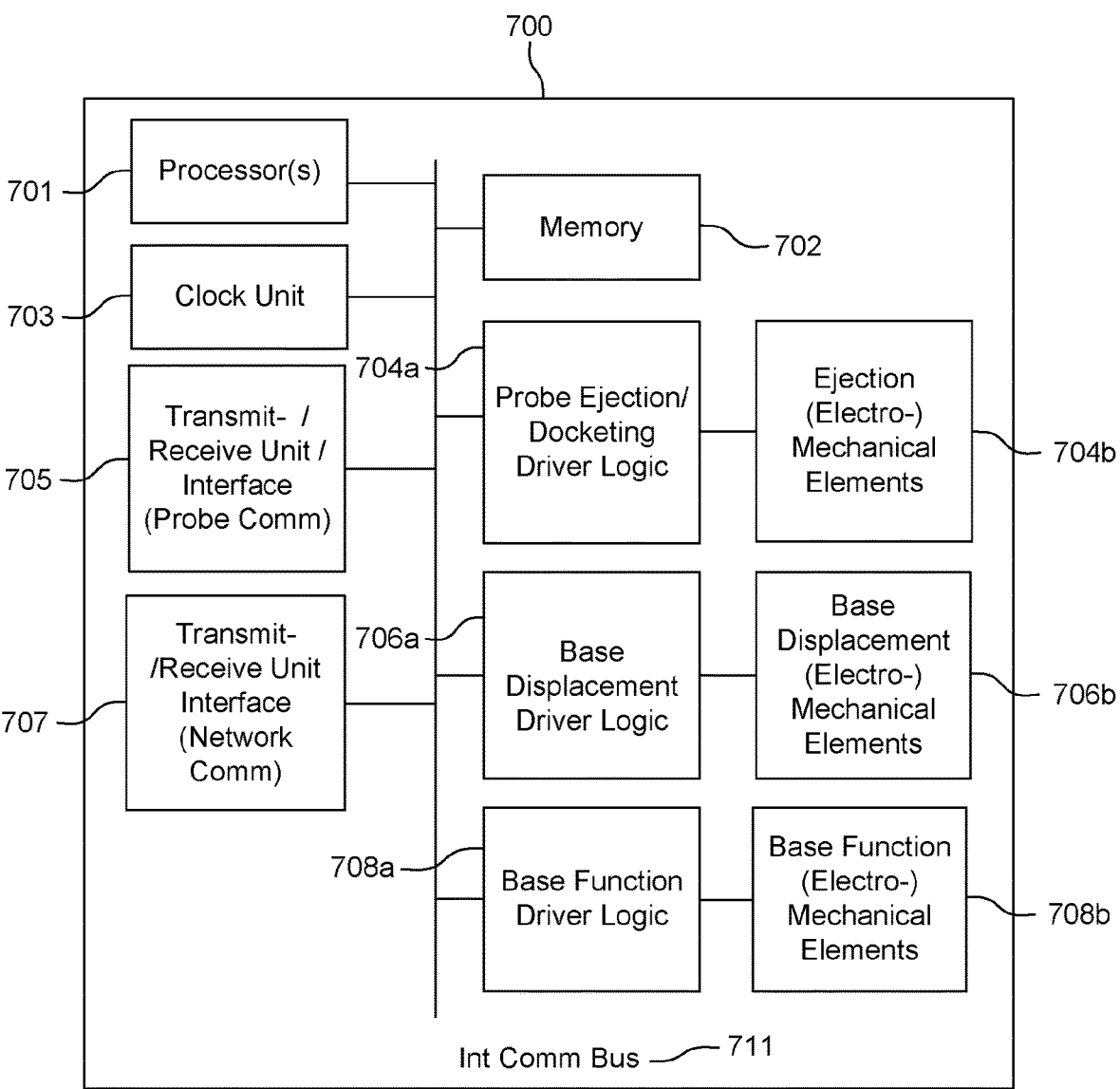
FIG. 7 is a functional diagram of a base according to an embodiment.

FIG. 7 is a functional diagram of a base according to an embodiment. Base 700 is an example embodiment of a robot 20. Base 700 includes circuitry comprising at least one processor 701, and memory 702. The memory includes instructions that, when executed by the at least one processor, among others, make the base perform, at least for the part that is performed by the base (another part is performed by the probe, the base and the probe may be considered as one device or a system), the method for obtaining observation data of an environment according to at least one of the described embodiments. The memory further includes instructions for the at least one processor to implement the function(s) for which the robot has been designed (e.g., cleaning, exploration, surveillance). The memory may further store data to be transmitted to a probe (e.g., configuration data) such as probe 800, or that is received from the probe (e.g., observation data, measurement data, data from a capturing session, probe identification data, probe configuration data). Clock unit 703 provides an internal clock for coordinating the operation of base 700 and of the probe. For example, the clock may be used to schedule trigger moments, and to trigger the observations by probe according to the scheduled trigger moments. Clock unit 703 may be synchronized with a similar clock unit in the probe for that purpose. A transmit/receive unit interface 705 is provided for communication between the base 700 and the probe. In case the probe is attached with a wire to the base and the wire attaching the probe is also suitable for data communication, or when the probe connects to the base using a connector when in rest (docking) position, the communication interface and communication protocol used may be one suitable for wired communication. In case the probe is wireless, the communication interface and protocol used may be one for wireless communication, such as Bluetooth, Zigbee, WiFi, or Near Field Communication (NFC). According to embodiments, a combination of wired and wireless communication may be used for data communication between the probe and the base. The base may further include a further transmit/receive unit interface 707 for network communication, for example for network communication with a server that manages the robot, and/or that processes the data obtained by the base from the probe, to establish a 3D map of the robot's environment, that may be transmitted to the robot, fully or partially, after processing. Alternatively, the base may only have one transmit/receive unit interface, for example, when the interface is used for data communication between the base and a server in the network, and for data communication between the base and the probe. The base 700 further includes driver logic (electronic circuitry) for probe ejection and/or probe docking, 704a, which logic is coupled to the mechanical, and/or electromechanical, and/or hydraulic or air pressure components 704b that are part of the base, and that are used for probe ejection and/or docking. The base further includes driver logic 706a for displacement (movement) of the base, and associated mechanical, electromechanical, hydraulic or air pressure hardware elements 706b (e.g., motors to operate wheels or tracks, air cushion, to name a few). Finally, the base includes driver logic 708a and associated mechanical, electromechanical, hydraulic or air pressure hardware elements 708b for providing the function for which it has been designed (e.g., cleaning, exploration, surveillance). An internal communication bus 711 interconnects the functions/elements described for internal communication between the functions/elements.

Figure 8:
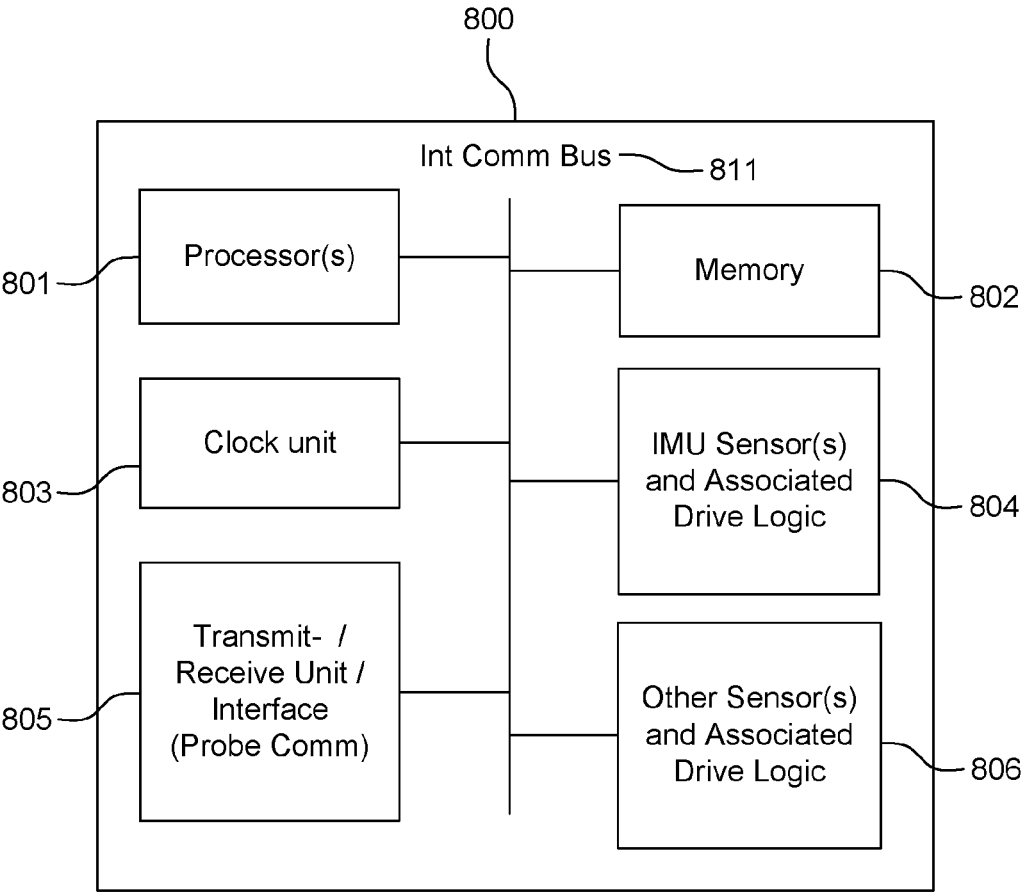
FIG. 8 is a functional diagram of a probe according to an embodiment.

FIG. 8 is a functional diagram of a probe 800 according to an embodiment, that is suitable for being used with base 700. Probe 800 includes at least one processor 801, and memory 802. The memory includes instructions that, when executed by the at least one processor, among others, make the probe perform, at least for the part that is performed by the probe (another part is performed by the base, the base and the probe being a system), the method for capturing 3-dimensional data according to at least one of the described embodiments. The memory further includes instructions for the at least one processor to implement the function(s) for which the probe has been designed (e.g., observation). The memory may further store data received by the probe (e.g., configuration data for the probe) from the base, or that is captured by the probe (e.g., observation data, measurement data, data from a capturing session), or that is specific to the probe such as probe identification and associated probe configuration in terms of flight (aerodynamic) related characteristics or features, type and number of sensor(s). Clock unit 803 provides an internal clock for coordinating the operation of the probe with that of the base. For example, the clock unit 803 may be used to trigger the observations by the probe according to scheduled trigger moments. Clock unit 703 may be synchronized with similar clock unit 803 in the base for that purpose. A transmit/receive unit interface 805 is provided for communication between the probe and the base. In case the probe is attached with a wire to the base and the wire attaching the probe is also suitable for data communication, or when the probe connects to the base using a connector when in rest (docking) position in the base, the communication interface and communication protocol used may be one suitable for wired communication. In case the probe is wireless, the communication interface and protocol used may be one for wireless communication, such as Bluetooth, WiFi, Zigbee, or Near Field Communication (NFC). According to embodiments, a combination of wired and wireless communication may be used for data communication between the probe and the base. The probe may include one or more IMU sensor(s) and associated drive logic (electronic circuitry) 804. The probe includes one or more other type of sensor(s) such as optical or infrared camera(s), laser telemetry distance sensor(s), temperature sensor(s), radiation sensor(s) and associated drive logic, 806. Finally, the described elements are connected to an internal data communication bus 811.

According to embodiment, probe 800 may include a battery or a capacitor to provide energy to the elements in the probe that are used for observation and data retrieval. According to an embodiment, the required energy is obtained from the movement of the probe during its trajectory and/or from its rotation. The above embodiments may combined, for example the probe may, before its ejection, given a rotation that charges a capacitor in the probe, and the energy stored in the capacitor is used by the probe during its trajectory (even if the probe rotation is cancelled when it is ejected). The probe battery or capacitor may also be (periodically) charged when the probe is in its rest position, for example via a connector or via inductive charging, or through rotation.

Figure 9:
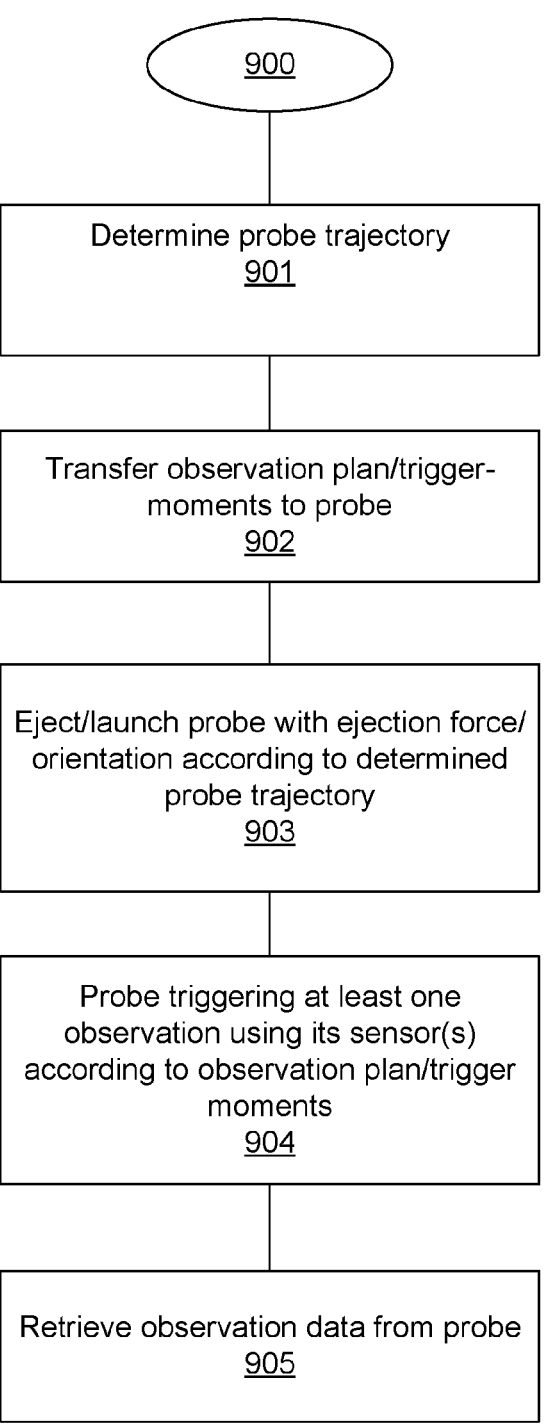
FIG. 9 is a flow chart of an embodiment of a method for obtaining data of an environment.

FIG. 9 is a flow chart of a method 900 for obtaining data of an environment, the method being implemented by a device having a base and a detachable probe comprising at least one sensor for environment observation. In step 901, a trajectory of the probe is determined, based on the probe features (characteristics) and on an observation plan. In step 902, the observation plan, or at least trigger moments for triggering observations according to the observation plan, is/are transferred to the probe. In step 903, the probe is ejected. The ejection force and/or orientation (e.g., horizontal and/or vertical angle) are computed and applied according to the determined trajectory. In step 904, the probe triggers one or more observations using its at least one sensor according to the observation plan/the trigger moments. In step 905, the probe is captured by the base and observation data, generated by at least one of the observations performed by the probe, is/are retrieved from the probe. Alternatively, in step 905, the observation data generated by the at least one of the observations performed by the probe is/are retrieved from the probe before the probe is captured by the base. Alternatively, in step 905, the observation data generated by the at least one of the observations performed by the probe is/are retrieved from the probe partly before the probe is captured by the base and partly after the probe is captured by the base.

According to an embodiment, the observation plan includes timestamps for triggering the one or more observations, e.g., a different timestamp per observation. The timestamps determine the observation moments.

According to an embodiment, the observation data is at least partly retrieved from the probe during its trajectory. For example, partly retrieved observation data may be a complete observation at a given point in the trajectory of the probe and may correspond to a 3D point cloud. For example, partly retrieved observation data may be a batch of observations at different points (locations) in the probe's trajectory, the points being following (sequential) or not. For example, partly retrieved observation data may be one or more observations at a given point in the trajectory of the probe, when the probe has been given a rotation; for example, the partly retrieved observation data may correspond to one observation of a 360° observation, or any number of observations that constitute a full 360° observation at the given point of the trajectory.

According to an embodiment, the observation moments are triggered according to the observation plan, and further based on measurements retrieved from an IMU in the probe. For example, the observation plan may contain instructions that the probe is to trigger observations when the probe is at a given speed, height, or is moving upwards or downwards, or in the apex position. For example, the observation plan may contain instructions that the probe is to trigger observations when its rotational speed (number of revolutions per time entity) is at a given value, or between given values.

According to an embodiment, the probe is given an amount of rotation when ejected. This is particularly useful for stabilizing the probe's movement for improved observation, and/or, when the probe has only a single sensor or a number of sensors, to enable 360 degree observations with the single sensor or the number of sensors.

According to an embodiment, the device for obtaining observation data of an environment includes a base; an ejection mechanism (301, 302, 204) for ejecting a detachable probe (205), the detachable probe including at least one sensor for environment observation; a reception arrangement (203, 204) for capturing the probe when it has been ejected and returns to the base, and for directing the probe to a docking location when it has been captured; the base comprising at least one processor, the at least one processor being configured to: determine a trajectory of the probe based on probe features and on an observation plan; transfer, to the probe, the observation plan; eject the probe, wherein at least ejection force and ejection orientation are determined by the at least one processor as a function of the determined trajectory; retrieve observation data from the probe, from the at least one observation performed by the probe through its sensors, wherein the observation moments are at least triggered according to the observation plan.

According to an embodiment, the ejection mechanism comprises a further device for giving an amount of rotation to the probe at its ejection from the base, and the at least one processor is further configured to determine the amount of rotation to give to the probe according to the observation plan.

According to an embodiment, the at least one processor is configured to establish the observation plan comprising the trajectory and the observation moments.

According to an embodiment, each of the observation moments correspond to an observation by the probe at a different point in the trajectory, e.g., in the x, y, z axis, ascending or descending, apex, or observation angle.

According to an embodiment, the observation data retrieved from the probe at different points in the trajectory are 3D point cloud slices and wherein the at least one processor is further configured to establish a 3D point cloud observation from aggregation of the 3D point cloud slices retrieved from the observation data.

Example, non-limited applications of the embodiments described herein, are:

Environment mapping;
Obstacle avoidance;
Security/surveillance;
Environmental quality measurement, such as air quality, temperature, humidity, radiation, to name a few;
Augmented or virtual reality.

It is to be appreciated that some elements in the drawings may not be used or be necessary in all embodiments. Some operations may be executed in parallel. Embodiments other than those illustrated and/or described are possible. For example, a device implementing the present principles may include a mix of hard- and software.

It is to be appreciated that aspects of the principles of the present disclosure can be embodied as a system, method or computer readable medium. Accordingly, aspects of the principles of the present disclosure can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the principles of the present disclosure can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. Some or all aspects of the storage medium may be remotely located (e.g., in the 'cloud'). It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method for obtaining observation data of an environment, wherein the method is implemented by a device having a base and a detachable probe, the probe comprising at least one three-dimensional (3D) depth sensor for observation of the environment, the probe being passive with regard to its orientation in the environment, the method comprising:

determining, by the base, a trajectory for the probe;

configuring, by the base, a probe ejection mechanism comprised in the base, according to the determined trajectory for the probe and features of the probe according to probe type, comprising configuring probe ejection force and ejection orientation;

ejecting the probe by the probe ejection mechanism, as a function of the configuration of the probe ejection mechanism, the probe, during the determined trajectory, triggering at least one observation using the at least one 3D depth sensor after the probe is ejected to obtain a 3D mapping of the environment; and receiving, by the base, the 3D mapping from the at least one observation performed by the probe during the determined trajectory.

2. The method of claim 1, wherein the features of the probe comprise aerodynamical features.

3. The method of claim 1, wherein the probe type information is retrieved from the probe by the base.

4. The method of claim 1, wherein the base further configures an amount of rotation given by the base to the probe at ejection.

5. The method of claim 1, wherein the observation data is at least partly received from the probe when the probe is ejected.

6. A device for obtaining observation data of an environment, the device comprising:

a base;

a probe ejection mechanism in the base for ejecting a probe, the probe comprising at least one three-dimensional (3D) depth sensor for observation of the environment, the probe being passive with regard to its orientation in the environment;

the base comprising at least one processor, the at least one processor being configured to:

determine a trajectory for the probe;

configure the probe ejection mechanism according to the determined trajectory for the probe and features of the probe according to probe type, the configuration comprising configuring probe ejection force and ejection orientation;

eject the probe via the probe ejection mechanism, as a function of the configuration of the probe ejection mechanism, the probe, during the determined trajectory, triggering at least one observation using the at least one 3D depth sensor after the probe is ejected to obtain a 3D mapping of the environment; and receive, by the base, the 3D mapping from the at least one observation performed by the probe during the determined trajectory.

7. The device of claim 6, wherein the features of the probe comprise aerodynamical features.

8. The device of claim 6, wherein the at least one processor is configured to retrieve the probe type information from the probe.

9. The device of claim 6, wherein the at least one processor is further configured to configure:

an ejection angle of the probe ejection mechanism;

an ejection force of the probe ejection mechanism; and an amount of rotation given by the probe ejection mechanism to the probe at ejection.

10. The device of claim 6, wherein the at least one processor is configured to receive the observation data at least partly when the probe is ejected.

11. The method of claim 1, wherein the probe type comprises one of:

a ball-shape type probe;

a kite shape type probe; or a frisbee shape type probe.

12. The method of claim 1, wherein the base uses compressed air for keeping the probe suspended in air for the observation.

13. The method of claim 4, wherein the probe ejection mechanism comprises an arrangement for giving the amount of rotation to the probe, and wherein the arrangement is one of a rifling or an air nozzle in a side wall of a probe launch space in the base.

14. The method of claim 1, wherein the base configures:

an ejection angle of the probe ejection mechanism;

an ejection force of the probe ejection mechanism; and an amount of rotation given by the probe ejection mechanism to the probe at ejection.

15. The device of claim 6, wherein the probe type comprises one of:

a ball-shape type probe;

a kite shape type probe; or a frisbee shape type probe.

16. The device of claim 6, wherein the base uses compressed air for keeping the probe suspended in air for the observation.

17. The device of claim 9, wherein the probe ejection mechanism comprises an arrangement for giving the amount of rotation to the probe, and wherein the arrangement is one of a rifling or an air nozzle in a side wall of a probe launch space in the base.

18. The device of claim 6, wherein the at least one processor is further configured to configure an amount of rotation given by the probe ejection mechanism to the probe at ejection.

19. The method of claim 1, wherein the base, having a capability to navigate in a two-dimensional (2D) ground plane, uses the 3D mapping for navigation in the environment, the base having a limited view of the environment from within the 2D ground plane.

20. The method of claim 1, wherein the 3D mapping is a cloud point, obtained from the at least one observation by aggregation of multiple point cloud slices, each of which are obtained at a different height of the probe.

21. The method of claim 1, wherein the at least one 3D depth sensor is a light detection and ranging (LIDAR) sensor.

22. The device of claim 6, wherein the base, having a capability to navigate in a two-dimensional (2D) ground plane, uses the 3D mapping for navigation in the environment, the base having a limited view of the environment from within the 2D ground plane.

23. The device of claim 6, wherein the 3D mapping is a cloud point, obtained from the at least one observation by aggregation of multiple point cloud slices, each of which are obtained at a different height of the probe.

24. The device of claim 6, wherein the at least one 3D depth sensor is a light detection and ranging (LIDAR) sensor.

* * * * *